US008940424B2

(12) United States Patent
Joye et al.

(10) Patent No.: US 8,940,424 B2
(45) Date of Patent: Jan. 27, 2015

(54) ACCUMULATOR ASSEMBLY FOR A BATTERY OF AN ELECTRIC OR HYBRID VEHICLE, PROVIDED WITH A DEFORMABLE CONNECTOR SUPPORT (75) Inventors: Olivier Joye, Clermont-Ferrand Cedex 9 (FR); Thierry Auguet, Clermont-Ferrand Cedex 9 (FR)

(73) Assignees: Compagnie Generale des Etablissements Michelin, Clemont-Ferrand (FR); Michelin Recherche et Techniques S.A., Granges-Paccot (CH)

( * ) Notice: Subject to any disclaimer, the term of this patent is extended or adjusted under 35 U.S.C. 154(b) by 0 days.

(21) Appl. No.: 13/695,610

(22) PCT Filed: Apr. 18, 2011

(86) PCT No.: PCT/EP2011/056124
§ 371 (c)(1),
(2), (4) Date: Jan. 23, 2013

(87) PCT Pub. No.: WO2011/134818
PCT Pub. Date: Nov. 3, 2011

(65) Prior Publication Data
US 2013/0171486 A1 Jul. 4, 2013

(30) Foreign Application Priority Data

Apr. 28, 2010 (FR) ...................................... 10 53289

(51) Int. Cl.
*H01M 2/20* (2006.01)
*H01M 2/10* (2006.01)
*H01M 2/26* (2006.01)
*H01M 10/48* (2006.01)

(52) U.S. Cl.
CPC .............. *H01M 2/20* (2013.01); *H01M 2/1072* (2013.01); *H01M 2/206* (2013.01); *H01M 2/266* (2013.01); *H01M 10/482* (2013.01); *H01M 2/1077* (2013.01)
USPC ............................................. 429/98; 429/158

(58) Field of Classification Search
CPC ............................. H01M 2/1077; H01M 2/20
USPC .................................................... 429/98, 158
See application file for complete search history.

(56) References Cited

U.S. PATENT DOCUMENTS 5,674,641 A * 10/1997 Cheu ............................. 429/306
2006/0105603 A1 5/2006 Nishio et al.

FOREIGN PATENT DOCUMENTS

EP 2 131 414 12/2009

* cited by examiner

*Primary Examiner* — Nicholas P D'Aniello
(74) *Attorney, Agent, or Firm* — Cozen O'Connor (57) ABSTRACT The accumulator assembly comprises a plurality of electrical energy accumulator elements 12 each comprising connecting electrodes 18, 20, assembly means 22, 24, 50, 52, 54 linking said electrodes, a connector 35 for connecting an external component to the assembly, and a connector support 67. The support 67 comprises a mounting base 64 borne by the assembly means and a fixing lug 65 supporting the connector and configured in such a way as to allow a movement of the connector relative to the mounting base in response to an external stress exerted on said connector and/or on the fixing lug.

20 Claims, 5 Drawing Sheets

ACCUMULATOR ASSEMBLY FOR A BATTERY OF AN ELECTRIC OR HYBRID VEHICLE, PROVIDED WITH A DEFORMABLE CONNECTOR SUPPORT

RELATED APPLICATIONS

This is a U.S. National Phase Application under 35 USC 371 of International Application PCT/EP2011/056124 filed on Apr. 18, 2011.

This application claims the priority of French application Ser. No. 10/53289 filed Apr. 28, 2010, the entire content of which is hereby incorporated by reference.

FIELD OF THE INVENTION

The present invention relates to the field of accumulator assemblies for electric or hybrid vehicle batteries, notably for motor vehicles.

The expression "electric motor vehicle" should be understood to mean a vehicle as defined in United Nations Regulation No. 100 relating to the type-approval of battery-powered electric vehicles.

The present invention relates more particularly to an accumulator assembly comprising a plurality of electrical energy accumulator elements each comprising connecting electrodes and assembly means linking said electrodes. A battery is formed by one or more accumulator assemblies and constitutes the electrical energy source used to power the electric or hybrid vehicle.

BACKGROUND OF THE INVENTION

The patent application EP-A1-2 131 414 describes an energy storage device comprising an accumulator assembly formed by a plurality of energy storage cells arranged inside an enclosure, and a connector added to a lateral wall of the enclosure. The connector comprises connection means for electrically linking the cells of the accumulator assembly, a unit controlling the operation of said cells and an electrical connection unit linked to the control unit and comprising electrical contact rods for connecting an additional component.

Also known, from the document US 2006/0105603, is a connector comprising a connecting portion, a support base provided with a mounting rod, and springs mounted around said rods and enabling the base to elastically support the connecting portion. This document deals only with a connector comprising a connecting portion that is mobile relative to a support base.

Also known, from the patent application WO 2008/086212, is a housing accommodating an accumulator assembly comprising a plurality of cylindrical accumulator elements. The accumulator assembly comprises connecting omnibus bars for electrically linking the connecting electrodes of the accumulator elements. The assembly also comprises a plate supporting the omnibus bars and connectors linking voltage measurement sensors to a control unit mounted outside the accommodating housing.

To link the connectors to the control unit, it is necessary to provide cables running inside the accommodating housing and extending outside thereof. This can make the operations complex to perform when mounting the accumulator assembly in the associated accommodating housing.

SUMMARY OF THE INVENTION

One object of the present invention is to remedy this drawback.

More particularly, one object is to provide an accumulator assembly that is easy to manufacture, to assemble and to mount inside the associated accommodating housing.

In one embodiment, the accumulator assembly comprises a plurality of electrical energy accumulator elements each comprising connecting electrodes, assembly means linking said electrodes, a connector for connecting an external component to the assembly, and a connector support comprising a mounting base borne by the assembly means and a fixing lug supporting the connector. The fixing lug is configured in such a way as to allow a movement of the connector relative to the mounting base in response to an external stress exerted on said connector and/or on the fixing lug.

Advantageously, the fixing lug is elastically deformable in at least one direction so as to allow the displacement of the connector relative to the mounting base.

The fixing lug may comprise a connecting part extending from the mounting base and a fixing part in extension of said connecting part and supporting the connector. The connecting part may comprise at least one bent portion. Preferably, at least the fixing part extends transversally relative to the mounting base. The connector support may be made of a single piece.

Advantageously, the accumulator elements are superposed on a stacking axis, at least the fixing part extending along the stacking axis.

In one embodiment, the assembly means comprise spacers arranged axially between at least some of the connecting electrodes of the accumulator elements, tie-rods extending axially through voids in the connecting electrodes and the spacers, and end flanges cooperating with the tie-rods to axially clamp the connecting electrodes and the stacked spacers.

At least a part of one of the end flanges or an electrically insulating spacer may form the mounting base. An assembly is thus obtained which comprises a limited number of pieces.

The assembly means may comprise electrically conductive spacers and connecting plugs each mounted inside a void of the associated conductive spacer and each linked to a specific electric cable, the electric cables being fixed to the connector.

Another aspect of the invention relates to an accumulator block comprising an accumulator assembly as defined previously and a housing delimiting a chamber accommodating said assembly. The housing comprises a main casing and a secondary casing having peripheral assembly edges and being provided with link means in the assembled position. One of said casings comprises a through passage or opening formed in one of its walls and through which the connector extends, protruding outwards.

The provision of a flexible fixing lug makes it possible to be able to move the connector relative to the mounting base and to the assembled accumulator elements so as to facilitate the introduction of the connector into the associated opening when assembling the casings of the housing. This movement of the connector can be obtained under the effect of a pressure exerted on the fixing lug and/or on the connector itself. The arrangement with the connector protruding outwards from the housing makes it possible to be able to directly connect a printed circuit board forming a control unit without having to provide connecting cables.

Moreover, the connector support is mounted on the stack of accumulator elements by virtue of the means that make it possible to assemble and link the various electrodes of the accumulator elements. This avoids having to provide specific mounting or fixing means for the connector support. The connector support is mounted on the assembly means linking the connecting electrodes of the accumulator elements or forms an integral part of said means.

BRIEF DESCRIPTION OF THE DRAWINGS

The present invention will be better understood on reading the detailed description of embodiments taken as nonlimiting examples and illustrated by the appended drawings, in which.

DETAILED DESCRIPTION OF THE DRAWINGS

Figure 1:
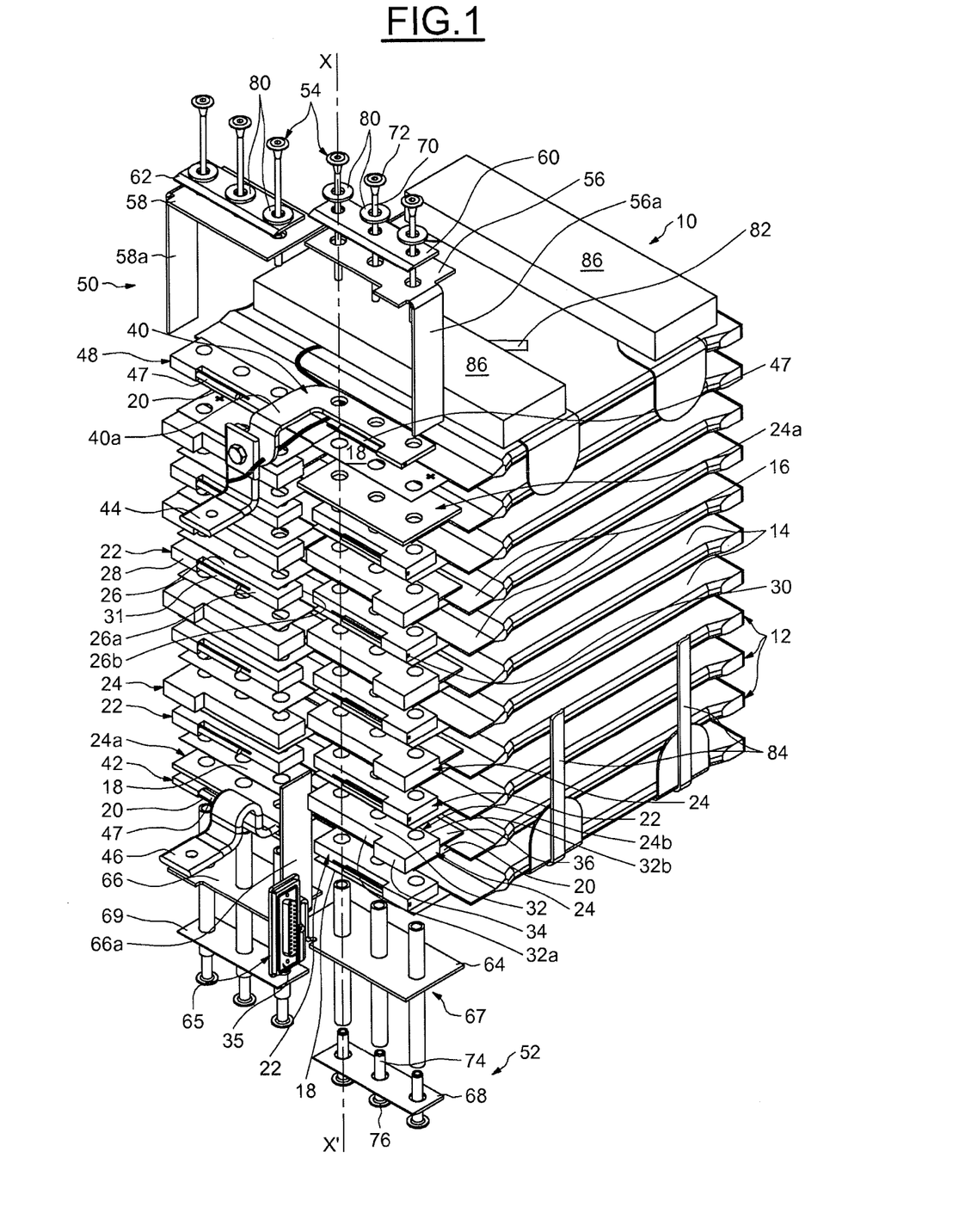
FIG. 1 is a perspective exploded view of an accumulator assembly according to an exemplary embodiment of the invention.
Figure 2:
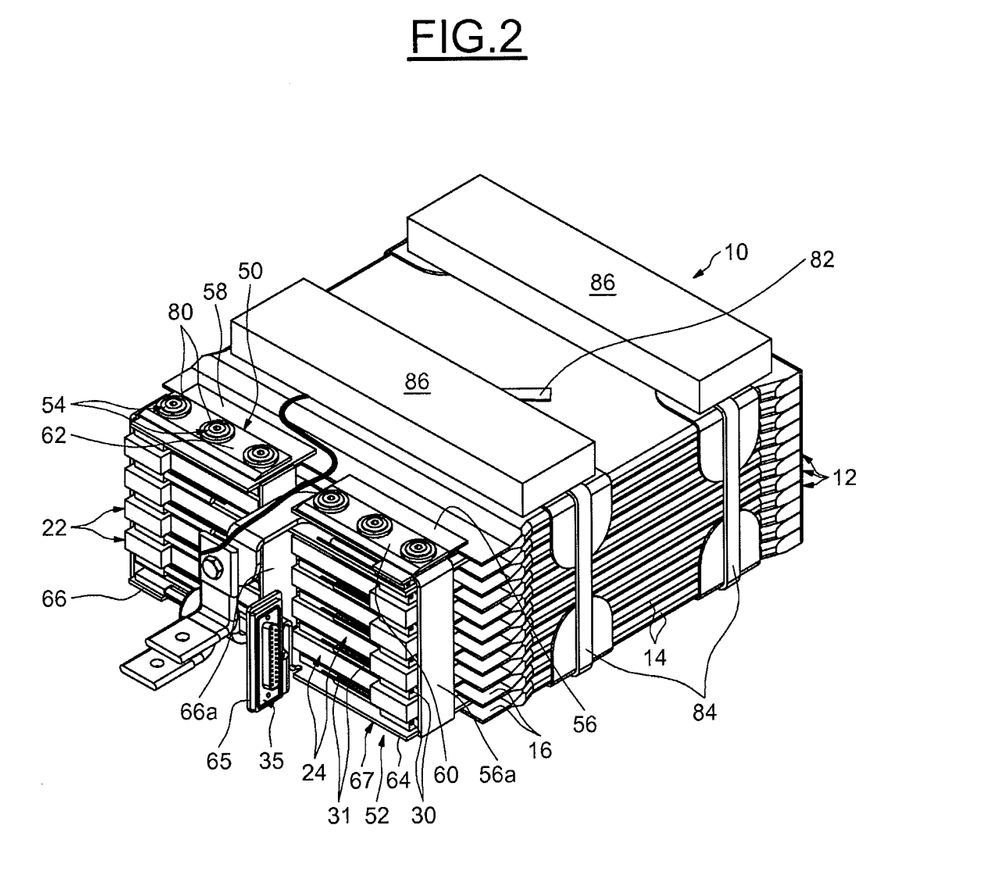
FIG. 2 is a perspective assembled view of the assembly of FIG. 1, FIGS. 3 and 4 are detail views of the accumulator assembly in the assembled position.

FIGS. 1 and 2 show an exemplary embodiment of an accumulator assembly 10 comprising a plurality of electrical energy accumulator cells or elements 12 superposed along a stacking axis X-X' that is assumed vertical.

The accumulator elements 12 are identical to one another and take the form of rectangular plates. They are stacked axially relative to one another in such a way that the main faces of two adjacent accumulator elements are facing. In the example illustrated, the number of accumulator elements 12 is equal to eleven. Obviously, it is possible to provide a different number of accumulator elements depending on the electrical energy that has to be delivered.

Each accumulator element 12 comprises an external encapsulating jacket 14 inside which are arranged a cathode and an anode separated by an electrolyte (not represented). The electrolyte may be, for example, an aprotic electrolyte in the case of a lithium-ion-type accumulator element or even a membrane-based polymer separator in the case of a polymer lithium-ion-type accumulator element.

The encapsulating jacket 14 comprises a sealed closure area 16 of reduced thickness comprising a free edge from which connecting positive 18 and negative 20 electrodes extend transversally relative to the axis X-X'. The connecting electrodes 18, 20 are transversally spaced apart relative to one another. They take the form of tabs and are produced from thin metal sheets that have a thickness less than those of the closure area 16.

In the exemplary embodiment illustrated, the electrical energy accumulator elements 12 are arranged in such a way as to arrange the positive 18 and negative 20 electrodes alternately, looking at the stacking axis X-X', so that the positive, respectively negative, electrode of an accumulator element is axially facing and adjacent to the negative, respectively positive, electrode of the immediately adjacent accumulator element situated below and/or above.

In order to link the various accumulator elements 12, the assembly 10 comprises conductive spacers 22 and insulating spacers 24 arranged axially between the axially aligned connecting electrodes 18, 20. The spacers 22 are formed from an electrically conductive material, for example made of a metallic material such as aluminium or any other appropriate material. The spacers 22 are formed from an insulating material, for example made of synthetic material or any other appropriate material.

In the exemplary embodiment illustrated, a conductive spacer 22 and an insulating spacer 24 are arranged between two axially adjacent accumulator elements 12, apart from the upper accumulator element of the stack and the adjacent lower accumulator element. In practice, between these two elements, only an insulating spacer is provided between the positive electrode 18 of the upper accumulator element 12 and the negative electrode 20 of the adjacent lower element, the other two electrodes 20, 18 of these two elements being directly in contact, one against the other.

The conductive spacers 22 are mounted axially between the positive electrode 18 of an accumulator element and the negative electrode 20 of the upper adjacent accumulator element. The insulating spacers 24 are mounted axially between the negative electrode 20 of an accumulator element and the positive electrode 18 of the upper adjacent accumulator element. The conductive 22 and insulating 24 spacers are arranged alternately along the axis X-X'.

Considering two adjacent accumulator elements 12, the conductive spacer 22 is mounted to bear against the upper face of the positive electrode 18 of the lower accumulator element and extends axially until it comes into contact with the lower face of the negative electrode 20 of the upper accumulator element. Conversely, the insulating spacer 24 is arranged between the upper face of the negative electrode 20 of the lower accumulator element and the lower face of the positive electrode 18 of the upper accumulator element coming axially into contact against said faces.

In the exemplary embodiment illustrated, the connecting electrodes 18, 20 and the conductive 22 and insulating 24 spacers are arranged in such a way as to mount the plurality of accumulator elements 12 in series. As a variant, it could be possible to provide a parallel mounting of the accumulator elements. To this end, it would be appropriate to respectively align the positive and negative electrodes along the stacking axis and to arrange the spacers appropriately.

The conductive spacers 22 are identical to one another and each comprise a base 26 in the form of a rectangular plate and that makes it possible to electrically link the electrodes 18, 20 of two axially superposed accumulator elements 12. To this end, the lower and upper surfaces of the base 26 are respectively in contact against the positive 18 and negative 20 electrodes of these accumulator elements 12. A front face 26a of the base 26, situated on the side opposite to the accumulator elements 12, is partly extended by a heel 28. The base 26 and the heel 28 are dimensioned in such a way as to mostly cover the faces of the associated electrodes 18, 20 while remaining set back or being flush with the peripheral edges of said electrodes. A rear face 26b of the base 26 remains at a distance from the closure area 16 of the associated accumulator elements 12.

Each spacer 22 comprises a through recess or void 30 formed in the heel 28 and extending transversally to the axis X-X' by being parallel to the front face 26a of the base 26. The void 30 of each conductive spacer 22 allows for a connecting plug to be fitted at one end of an electric cable 31. Each spacer 22 therefore has an associated electric cable 31 comprising a connecting plug.

The connecting plug of each electric cable 31 forms a male plug which can be mounted inside the associated void 30 forming a female plug. More specifically, the connecting plug comprises a conductive terminal part that is housed in the void 30 to electrically connect the cable 31 and the associated conductive spacer 22. The terminal part is advantageously elastically deformable and can be fixed to the spacer 22 by pinching inside the void 30. The fixing of the connecting plug to the spacer 22 can obviously be done by any other appropriate means, for example by crimping, screwing, etc. The connecting plug may advantageously be of banana plug type.

Each electric cable 31 also comprises a protective electric fuse linked to the connecting plug. The fuse can be mounted on the electric cable 31 so as to be situated in the immediate vicinity of the connecting plug. The fuse comprises a conductive part designed to melt when the current passing through the electric cable 31 is above a predetermined threshold. The fuse may, for example, be of ultra-fast FF type according to the international standard IEC 60127.

Figure 3:
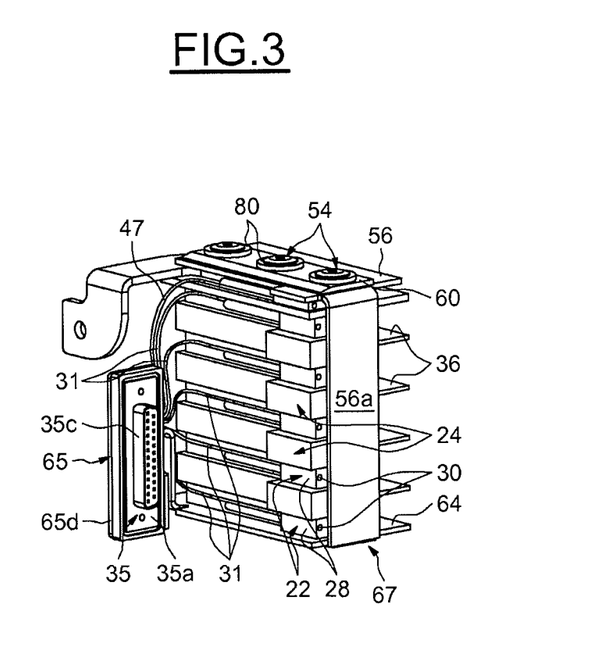
Figure 4:
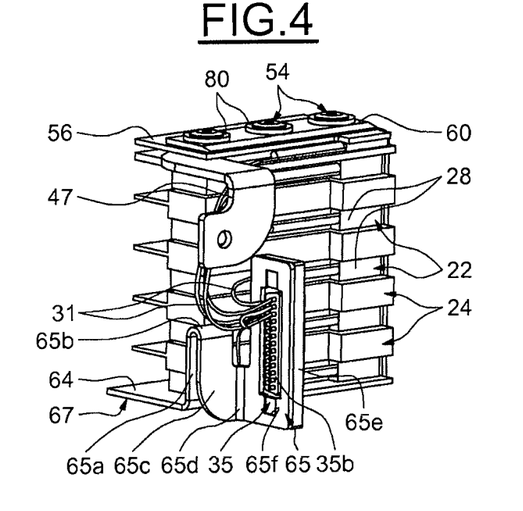

As illustrated in FIGS. 3 and 4, opposite the end linked to the connecting plug connected to the associated spacer 22, each electric cable 31 is fixed to a common connector 35. The connector 35 comprises a fixing body 35a, a first male connecting area 35b comprising contact pins for fixing the electric cables 31, and a second opposite female connecting area 35c to which a printed circuit board (not represented) can advantageously be directly connected to perform voltage measurements. The connection areas 35b, 35c extend on either side of the body 35a and are electrically connected. The connector 35 may, for example be a SUB-D connector.

As will be described below, the connector 35 is mounted on a deformable support so as to facilitate its mounting inside an associated housing.

Referring once again to FIGS. 1 and 2, the spacers 24 comprise first and second subgroups of insulating spacers 24a, 24b. The insulating spacers 24a are identical and take the form of thin rectangular plates. There are two of them. The lower surface of one of these spacers 24a is mounted indirectly against the upper face of the negative electrode 20 of the lower accumulator element 12 of the stack, as will be described below. The upper surface of this spacer is mounted in contact against the lower face of the positive electrode 18 of the accumulator element situated axially above. The spacer 24 makes it possible to provide electrical insulation for these two electrodes. The other spacer 24a bears against the lower face of the positive electrode 18 of the upper accumulator element 12 of the stack and the upper face of the negative electrode 20 of the accumulator element 12 situated axially below.

The spacers 24b are mounted axially between the negative electrode 20 of an accumulator element and the positive electrode 18 of the upper adjacent accumulator element for the accumulator elements 12 arranged axially between the lower and upper accumulator elements of the stack.

The spacers 24b are identical to one another and each comprise a base 32 taking the form of a rectangular plate that makes it possible to electrically insulate the electrodes 20, 18 of the axially superposed accumulator elements 12. The base 32 is dimensioned so as to mostly cover the faces of the electrodes 20 and 18, a front face 32a of said base being substantially axially flush with the front free edge of the electrodes. The front face 32a of the base 32 is partly extended by a heel 34 extending so as to protrude relative to the front free edge of the electrodes, and more generally beyond the conductive spacers 22. The heels 34 are axially aligned with the heels 28 of the conductive spacers 22. The heels 34 make it possible to ensure the electrical insulation of the accumulator assembly 10 relative to the accumulator assembly housing.

Each spacer 24b comprises an extension 36 of small thickness extending from the rear face 32b of the base and designed to bear against one of the closure areas 16 of the accumulator elements associated with the spacer. This extension 36 makes it possible to avoid a contact between the negative 20 and positive 18 electrodes to be insulated of two adjacent accumulator elements, in the event of a possible deformation of one or both of these electrodes. In practice, since the electrodes 18, 20 are produced in the form of thin metal sheets, they can be folded slightly and come into contact with the axially adjacent electrode, which can create a short circuit. The dependability of the accumulator assembly 10 is thus increased.

The arrangement of the first subgroup of spacers 24a relative to the electrodes 18, 20 and to the jackets 14 of the associated accumulator elements 12 is similar to that which has just been described for the second subgroup of spacers 24b.

In order to be able to electrically connect the assembly 10 to an electrical energy consumer, which may advantageously be the electric motor drive for the vehicle, upper 40 and lower 42 attachments are provided respectively for fixing power cables 44, 46. The upper attachment 40 is mounted to bear against the upper face of the positive electrode 18 of the upper accumulator element of the stack. The lower attachment 42 is mounted in contact with the upper face of the negative electrode 20 of the lower accumulator element of the stack and the corresponding spacer 24a. The spacer 24a is thus mounted indirectly in contact against said negative electrode 20. The attachments 40, 42 are made of an electrically conductive material.

The lower attachment 42 has a structure identical to that of the conductive spacers 22 but with a reduced thickness. One end of the power cable 46 is axially clamped between the attachment 42 and the corresponding spacer 24a. The upper attachment 40 also has a structure similar to the spacers 22 and also comprises an extension 40a to allow for the fixing of the power cable 44.

In a manner similar to the conductive spacers 22, the attachments 40, 42 comprise voids provided for the mounting of a connecting plug of an electric cable 47 which is identical to the cables 31. On the side opposite to the connecting plug, the electric cables 47 are fixed to the connector 35 in the connection area 35b. They make it possible to perform a measurement of the total voltage at the terminals of the accumulator assembly 10. This measurement is performed between the positive electrode 18 of the upper accumulator element and the negative electrode 20 of the lower accumulator element of the stack.

The assembly 10 also comprises a plate 48 with a structure identical to that of the conductive spacers 22 and mounted axially bearing on the upper face of the negative electrode 20 of the upper accumulator element 12 of the stack. This plate 48 comprises a void provided for the mounting of a connecting plug of an electric cable 47. On the side opposite to the connecting plug, the cable 47 is fixed to the connector 35 in order to be able to perform a voltage measurement.

To ensure the fixing of the electrodes 18, 20 of the accumulator elements relative to the conductive 22 and insulating 24 spacers, the assembly 10 comprises upper 50 and lower 52 end flanges and assembly tie-rods 54 cooperating with the end flanges to axially clamp the spacers and connecting electrodes.

The upper end flange 50 comprises a first bearing plate 56 mounted axially in contact against the upper surface of the attachment 40 and extended perpendicularly at a lateral edge by a lug 56a extending axially downwards. The lug 56a has an axial dimension such that, in the assembled position of the accumulator elements 12, its lower end is situated axially below the positive electrode 18 of the lower accumulator element of the stack, substantially level with the lower end flange 52. The lug 56a extends in the vicinity of the electrodes 18, 20 and spacers 22, 24 stacked axially on the outer side of the stack, i.e. on the side opposite to the other stack of electrodes and spacers. The lug 56a forms a protection or barrier making it possible to ensure the electrical insulation of the assembly 10 relative to its associated accommodating housing.

The end flange 50 also comprises a second bearing plate 58 coming axially into contact against the upper surface of the plate 48, and back plates 60, 62 respectively coming axially into contact against the upper surfaces of the bearing plates 56, 58. A lateral edge of the bearing plate 58 is extended by an axial lug 58a symmetrical to the lug 56a by considering an axial median plane of the accumulator elements 12. The lug 58a extends axially downwards and its lower end is situated axially at the level of the lower end flange 52 in the assembled position of the accumulator elements 12. The bearing plates 56, 58 are made of an insulating material and have a rectangular form.

The lower end flange 52 comprises first and second bearing plates 64, 66 coming respectively into contact against the lower faces of the positive 18 and negative 20 electrodes of the lower accumulator element 12 of the stack. The bearing plates 64, 66 are made of an insulating material and have a rectangular form.

The bearing plate 64 forms a mounting base from which extends a lug 65 provided for the fixing of the connector 35. The lug 65 extends from a front long side edge of the base 64 opposite to the accumulator elements 12. The lug 65 is situated on the base 64 on the side of the bearing plate 66. The bearing plate or mounting base 64 and the lug 65 form a connector support 67.

Figure 5:
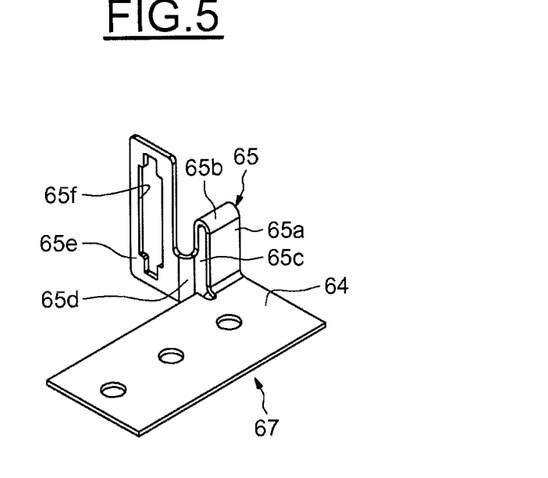
FIG. 5 is a detail view of a connector support of the accumulator assembly of FIGS. 1 and 2.

As is illustrated more visibly in FIGS. 3 to 5, the lug 65 comprises a first rectilinear portion 65a extending from the base 64 axially upwards towards the bearing plate 56 of the upper end flange. The axial dimension of the rectilinear portion 65a corresponds substantially to the axial dimension of two conductive spacers 22 and one insulating spacer 24 stacked. The rectilinear portion 65a is situated at a distance from the spacers 22, 24 and from the neighbouring electrodes 18, 20. The upper end of the rectilinear portion 65a is extended by a downward curved bent portion 65b, which is in turn extended by a second rectilinear portion 65c extending axially downwards and having a dimension substantially equal to the rectilinear portion 65a. The rectilinear portion 65c is spaced apart from the rectilinear portion 65a and situated on the side opposite to the base 64.

A lateral edge of the rectilinear portion 65c opposite to the bearing plate 66 (FIGS. 1 and 2) is extended by a bent portion 65d, which is in turn extended by a fixing part 65e provided to support the connector. The rectilinear portions 65a, 65c and bent portions 65b, 65d constitute a connection part extending from the base 64 which is extended by the fixing part 65e. The bent portions 65b, 65d form two folds on this connecting part. In the exemplary embodiment illustrated, the fixing part 65e has a generally rectangular form and is oriented in such a way that its main face extends transversally to the base 64 and that its long side edges extend along the stacking axis of the accumulator assembly. A through void 65f is formed on the fixing part 65e to allow for the mounting and fixing of the body 35a of the connector 35. The connection areas 35b and 35c extend on either side of the fixing part 65e of the connector support 67.

Referring once again to FIGS. 1 and 2, a lateral edge of the bearing plate 66 of the end flange 52 is extended by an axial lug 66a extending upwards through the transversal space situated between the two axial stacks of connecting electrodes 18, 20 and spacers 22, 24. The upper end of the axial lug 66a is situated axially at the level of the bearing plate 58 of the upper end flange 50 in the assembled position of the accumulator elements 12.

The end flange 52 also comprises back plates 68, 69 that respectively bear against the lower surfaces of the bearing plates 64, 66.

The assembly tie-rods 54 pass axially through the stack of electrodes 18, 20 and of spacers 22, 24 to clamp them axially between the end flanges 50, 52. To allow for the fitting of the assembly tie-rods 54, the connecting electrodes 18 and 20, the spacers 22 and 24, the attachments 40 and 42, the plate 48, the bearing plates 56, 58, 64, 66 and the back plates 60, 62, 68, 69 comprise axially aligned through voids. In the exemplary embodiment illustrated, three voids are provided on each of these members.

The assembly tie-rods 54 are identical to one another and there are six of them. Each tie-rod 54 comprises a male part comprising a threaded rod 70, extending axially and provided, at its upper end, with a clamping head 72 comprising a tapped hole to allow for the insertion of a wrench for the purpose of screwing. Each tie-rod 54 also comprises a female part comprising a cylindrical mounting portion 74 provided internally with threading corresponding to that of the rod 70. The lower end of the mounting portion 74 comprises a bearing head 76 coming into contact against the corresponding back plate 68, 69 of the lower end flange 52. The screwing of the threaded rods 70 in the mounting portions 74 enables the end flanges 50, 52 to axially clamp the insulating spacers 22, 24 and the electrodes 18, 20 and obtain an axial contact between them in order to produce the electrical connection for the stacked accumulator elements 12.

Insulating sleeves 78 are provided for mounting the threaded rods 70 and the mounting portions 74 inside voids formed on the connecting electrodes 18 and 20, the spacers 22 and 24, the plate 48, the attachments 40 and 42, the bearing plates 56, 58, 64, 66 and the associated back plates. The insulating sleeves 78 are interposed between the assembly tie-rods 54 and these voids in order to electrically insulate the tie-rods. To this end, the sleeves 78 are made of an electrically insulating material, for example of silicone.

In order to ensure that the axial contact is maintained between the electrodes 18, 20 of the accumulator elements and the spacers 22 and 24, the assembly 10 comprises elastic prestressing means 80 each arranged around one of the rods 70 of the assembly tie-rods 54 and mounted axially in contact with the associated clamping head 72 and with the corresponding back plate 60, 62 of the end flange 50. The prestressing means 80 are identical to one another and each take the form of an annular washer with a rectangular section in the free state. The washers may, for example, be Belleville or plate-type washers. Alternatively, it is possible to use any other elastic prestressing means with axial elasticity suitable for exerting an axial prestressing force.

After tightening the assembly tie-rods 54, the prestressing means 80 can exert axial forces on the upper end flange 50 so as to apply an axial prestress on the electrodes 18, 20 of the accumulator elements and the spacers 22, 24. A zero axial play is thus ensured between the two axial stacks of electrodes 18, 20 and of connecting spacers, guaranteeing a good electrical connection of the various accumulator elements 12. Furthermore, the prestressing means 80 make it possible to apply, between the electrodes 18, 20 and the spacers 22, 24, a contact pressure that is generally uniform over time.

The assembly 10 also advantageously comprises probes for measuring the temperature of the accumulator elements 12. A first probe 82 is fixed onto the upper face of the upper accumulator element of the stack, a second probe being able to be fixed onto an accumulator element situated, for example, at mid-height of the stack. The measurement probes can be fixed by gluing. The probes are linked to the connector 35 by cables (not represented) so as to be able to perform a check on the temperature of the assembly 10.

In order to individually insulate the accumulator elements 12 from one another, an insulating strip (not represented) is provided on the various accumulator elements 12. To hold the accumulator elements 12 in a fixed manner relative to one another, clamping collars 84 are provided around the stack of accumulator elements 12. Two strips 86 of foam are also glued onto the insulating strip portion covering the upper face of the upper accumulator element 12 of the stack.

Figure 6:
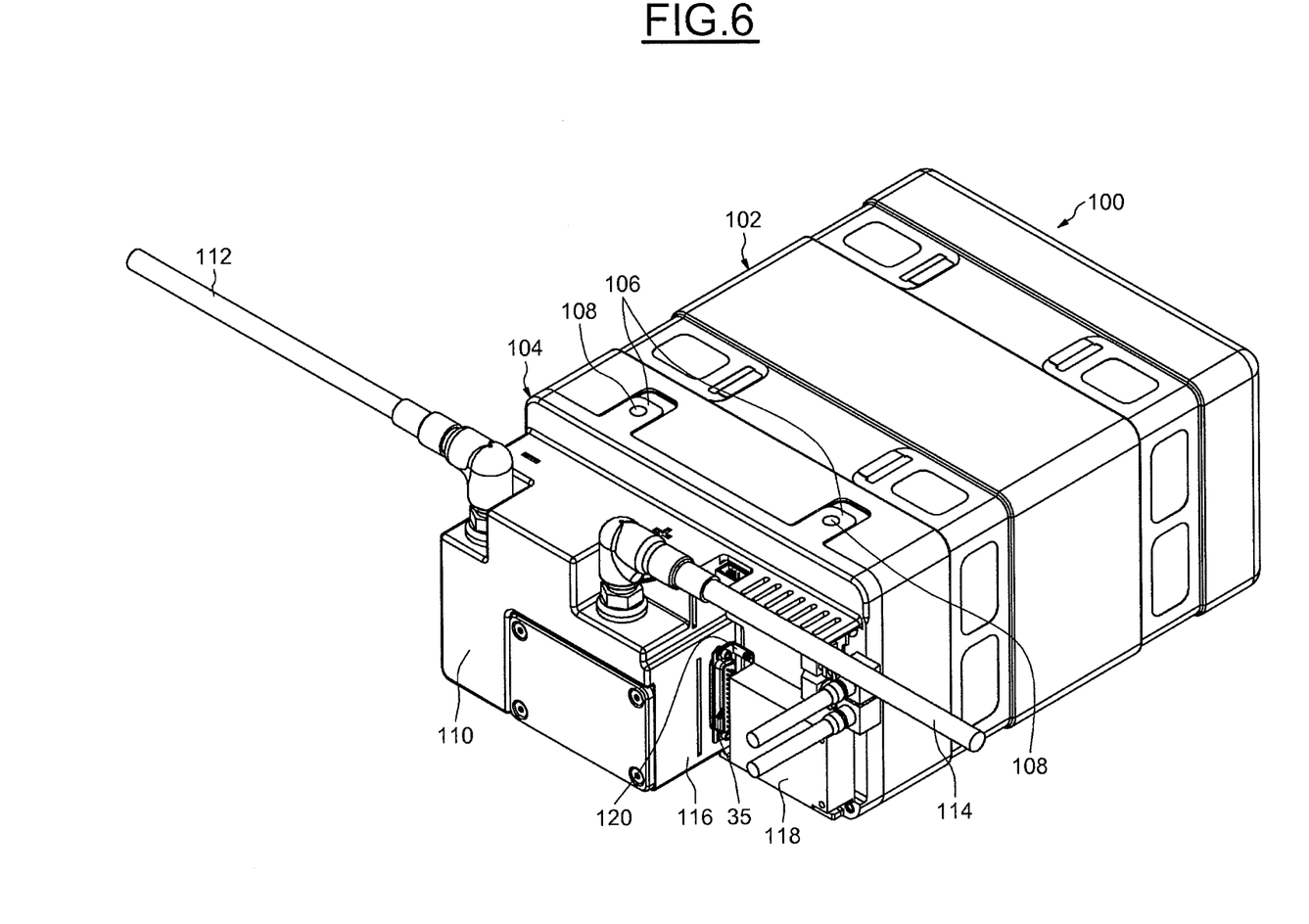
FIG. 6 is a perspective view of a housing inside which the accumulator assembly of FIGS. 1 and 2 is mounted.

After assembly, the accumulator element 10 can be mounted inside the associated housing 100 illustrated in FIG. 6. The housing 100 mainly comprises a main casing 102 that is open on one side and a secondary casing 104 that blocks said side so that the housing delimits an accommodating chamber inside which the accumulator assembly is mounted. The accumulator elements of the assembly are supported by the main casing 102 which is generally of parallelepipedal form, the connecting electrodes of said elements extending to protrude from said casing and being housed in the secondary casing 104.

The secondary casing 104 and the main casing 102 have peripheral assembly edges of rectangular form and coupled to one another in the assembled position of the housing. To hold it in this assembled position, the secondary casing 104 comprises external fixing lugs 106, which are flat and spaced apart. They extend locally from the peripheral assembly edge of said casing and cooperate with protruding external bosses 108 provided on the main casing 102.

The secondary casing 104 also comprises a bottom 110 which is opposite and parallel to a bottom of the main casing 102. The secondary casing 104 has, seen from outside, a hollow lateral form situated on one side and defining a vertical lateral wall 116 which is perpendicular to the bottom 110. The secondary casing 104 also has upper hollow forms, spaced apart horizontally relative to the bottom 110, opening out laterally and defining horizontal walls (not referenced). Electric cables 112, 114 pass through the horizontal walls of the secondary casing 104 in order to be each linked to one of the power cables of the accumulator assembly.

The vertical wall 116 of the secondary casing 104 comprises a through passage or opening (not referenced) through which extends the connector 35 to protrude outwards to enable a printed circuit board 118 to be directly connected. The connector 35 is fixed to the secondary casing 104 via brackets 120 screwed, on the one hand, onto said casing and on the other hand onto the body of the connector.

In order to mount the accumulator assembly 10 inside the housing 100, the accumulator elements 12 should first be engaged inside the main casing 102, then the secondary casing 104 should be snap-fitted thereon by cooperation of the tabs 106 and bosses 108. This final operation is facilitated by the deformable nature of the fixing lug 65 of the connector support 67.

Indeed, when fitting the secondary casing 104 onto the main casing 102, it is possible to deform the elastic lug 65 so as to enable the connector 35 to move relative to the mounting base 64, and more generally relative to the stack of connecting electrodes of the accumulator elements 12 and spacers 22, 24. Thus, the introduction of the connector 35 into the associated through opening formed on the lateral wall 116 of the secondary casing 104 can be facilitated before snap-fitting said casing onto the main casing 102.

Given the configuration of the portions 65a to 65d of the fixing lug, when a pressure is exerted on the lug 65 and/or on the connector 35, the fixing part 65e supporting the connector 35 can be moved by elastic deformation in a plurality of directions relative to the accumulator elements 12.

Furthermore, the elastic mounting of the connector 35 by the lug 65 also facilitates the fitting of the brackets 120 and the screwing thereof onto the secondary casing 104 and onto the connector 35. In practice, during this coupling of the connector 35 on the housing 100, it can be slightly moved in the through opening formed in the lateral wall 116 of the secondary casing 104. After the connector 35 and the housing 100 have been secured, the lug 65 can remain in a slightly deformed position with no risk of deterioration.

So as to allow for an elastic deformation of the fixing lug 65, the connector support 67 is advantageously made of a single piece by moulding a deformable synthetic material such as polypropylene (PP) or polyethylene (PE).

In the exemplary embodiment illustrated, the support 67 for the connector is formed by a part of the lower end flange 52. In a variant embodiment, if the secondary casing 104 of the housing 100 has a different external form, it is possible to use the bearing plate 56 of the upper end flange 50 to produce the support for the connector.

Figure 7:
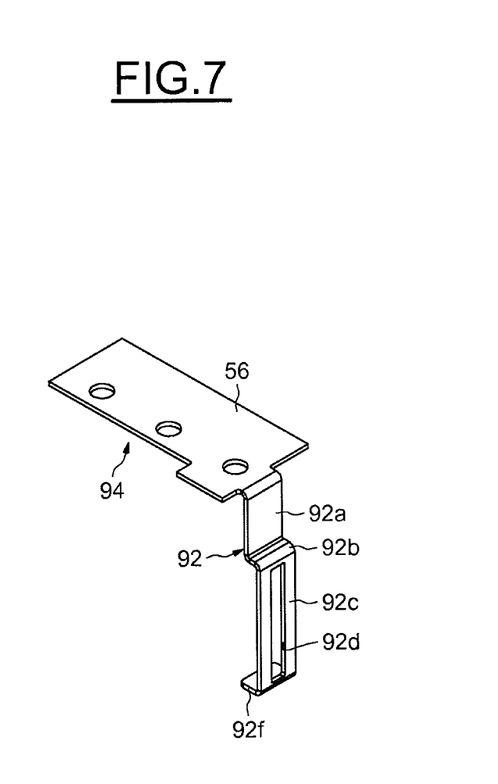
FIG. 7 is a detail view of a connector support according to a second exemplary embodiment.

To this end, as illustrated in FIG. 7 in which identical elements are given the same references, the bearing plate 56 comprises a lug 92 provided for fixing the connector and extending from the outer lateral edge opposite to the other bearing plate 58 (FIGS. 1 and 2) of the upper end flange 50. The bearing plate 56 and the lug 92 form a connector support 94.

The lug 92 comprises a first rectilinear portion 92a extending from the outer lateral edge of the bearing plate 56 axially downwards, considering the stacking axis of the accumulator elements. The lower end of the rectilinear portion 92a is extended outwards by a bent portion 92b forming a fold extending transversally to said rectilinear portion. The bend portion 92b is extended axially downwards by a rectilinear fixing part 92c oriented in such a way that its main face extends transversally to the base-forming bearing plate 56. A through-void 92d is formed on the fixing part 92c to enable the body of the connector to be mounted and fixed. The lower end of the fixing part 92c is extended inwards by a bent end 92f that can form an abutment. In this variant embodiment, the lug 92 is deformable in two perpendicular directions. In another variant, it could also be possible to provide a lug added onto the bearing plate and mounted to rotate on said plate so as to be able to be moved relative to the bearing plate in response to an external stress.

In the two exemplary embodiments illustrated, the connector support is formed by one of the end flanges. In a variant embodiment, it could be possible to use one of the insulating spacers 24 to form the connector support. In this case, a deformable fixing lug should be provided on the spacer 24, extending from its base 32 in a way similar to the exemplary embodiments illustrated. Alternatively, it is also possible to provide a piece specifically designed to support the connector, i.e. distinct from the end flanges 50, 52 and the spacers 24, and mounted in the stack axially clamped by the end flanges 50, 52.

Moreover, the orientation of the fixing lug of the connector support relative to the base could also be modified according to the position of the opening associated with the connector on the associated housing.

In the exemplary embodiment of the assembly 10 illustrated in FIGS. 1 and 2, the negative electrode 20 of the upper accumulator element 12 comes directly into contact with the positive electrode 18 of the lower adjacent accumulator element. For the other axially superposed connecting electrodes 18, 20, a conductive or insulating spacer is inserted between two immediately successive electrodes. It could, however, be possible, without departing from the context of the present invention, to provide a direct axial contact between other axially adjacent positive and negatives electrodes by providing a suitable arrangement of the spacers to retain the desired electrical connection of the accumulator elements 12.

The invention claimed is:

1. An accumulator assembly comprising:
   a plurality of electrical energy accumulator elements each comprising connecting electrodes;
   assembly means linking said connecting electrodes;
   a connector for connecting an external component to the accumulator assembly; and
   a single-piece connector support comprising:
      a mounting base borne by said assembly means; and
      a fixing lug extending from said mounting base, provided with a through void configured for mounting and fixing of said connector, and configured in such a way as to allow a movement of said connector relative to said mounting base in response to an external stress exerted on said connector and/or on said fixing lug.

2. The accumulator assembly of claim 1, wherein said fixing lug is elastically deformable in at least one direction.

3. The accumulator assembly of claim 1, wherein said fixing lug comprises a connecting part extending from said mounting base and a fixing part in extension of said connecting part and supporting said connector.

4. The accumulator assembly of claim 3, wherein said connecting part comprises at least one bent portion.

5. The accumulator assembly of claim 3, wherein said fixing part extends transversally relative to said mounting base.

6. The accumulator assembly of claim 3, wherein said plurality of electrical energy accumulator elements are superposed on a stacking axis, said fixing part extending along said stacking axis.

7. The accumulator assembly of claim 1, wherein said assembly means comprise spacers arranged axially between at least some of said connecting electrodes of said plurality of electrical energy accumulator elements, tie-rods extending axially through voids in said connecting electrodes and said spacers, and end flanges cooperating with said tie-rods to axially clamp said connecting electrodes and said stacked spacers.

8. The accumulator assembly of claim 7, wherein at least a part of one of said end flanges or an electrically insulating spacer forms said mounting base.

9. The accumulator assembly of claim 7, further comprising electrically conductive spacers and connecting plugs, each of said connecting plugs mounted inside a void of a corresponding one of said electrically conductive spacers and each linked to a corresponding one of electric cables, said electric cables being fixed to said connector.

10. An accumulator block comprising the accumulator assembly of claim 1 and a housing delimiting a chamber accommodating the accumulator assembly, said housing comprising a main casing and a secondary casing having peripheral assembly edges and being provided with link means in an assembled position, one of said main casing and said secondary casing comprising an opening formed in one of its walls and through which said connector extends, protruding outwards.

11. An accumulator assembly comprising:
   a plurality of electrical energy accumulator elements each comprising a positive electrode and a negative electrode and a conductive spacer and an insulating spacer;
   an upper end flange and a lower end flange, and at least one assembly tie-rod elongated in an axial direction for assembling a stack of said positive and negative electrodes and said conductive and insulating spacers of said plurality of electrical energy accumulator elements, wherein said conductive and insulating spacers are arranged along said axial direction between said positive and negative electrodes, and wherein said at least one assembly tie-rod passes axially through said stack of said positive and negative electrodes and said conductive and insulating spacers to clamp said stack between said upper and lower end flanges;
   a connector for connecting an external component to the accumulator assembly; and
   a single-piece connector support comprising:
      a mounting base arranged between one of said upper and lower end flanges; and
      a fixing lug extending from said mounting base, provided with a through void configured for mounting and fixing of said connector, and configured in such a way as to allow a movement of said connector relative to said mounting base in response to an external stress exerted on said connector and/or on said fixing lug.

12. The accumulator assembly of claim 11, further comprising an upper attachment and a lower attachment for connecting the accumulator assembly to an electrical energy consumer.

13. The accumulator assembly of claim 12, wherein said electrical energy consumer comprises an electric motor driver for one of an electric vehicle and a hybrid vehicle.

14. The accumulator assembly of claim 12, wherein said upper and lower attachments are configured for fixing positive and negative power cables that are coupled to said electrical energy consumer.

15. The accumulator assembly of claim 12, wherein said upper attachment is mounted to bear against the upper face of said positive electrode of the upper accumulator element of said stack, and wherein said lower attachment is in contact with the upper surface of said negative electrode of the lower accumulator element of said stack and the corresponding spacer.

16. The accumulator of claim 11, wherein each positive spacer in said stack comprises one of a through recess and a void that forms a female plug having a conductive terminal part for fitting a connecting plug of an electric cable formed as a male plug.

17. The accumulator of claim 16, wherein said connector comprises a fixing body and a first male connecting area including contact pins for said electric cables and a corresponding second opposite female connecting area to which a circuit board can be connected.

18. The accumulator of claim 17, wherein said circuit board is configured for performing voltage measurements for each of said plurality of electrical energy accumulator elements.

19. The accumulator of claim 11, wherein said positive and negative electrodes and said conductive and insulating spacers each comprises at least one axially aligned through void configured to allow for fitting of said at least one assembly tie-rod.

20. The accumulator of claim 11, wherein said single piece connector support is made of a deformable synthetic material.

\* \* \* \* \*